United States Patent
Miller

(10) Patent No.: US 9,010,566 B2
(45) Date of Patent: *Apr. 21, 2015

(54) CONTAINER PROTECTOR

(76) Inventor: Dennis L. Miller, Bettendorf, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/113,759

(22) Filed: May 23, 2011

(65) Prior Publication Data

US 2011/0283509 A1   Nov. 24, 2011

Related U.S. Application Data

(60) Provisional application No. 61/347,254, filed on May 21, 2010, provisional application No. 61/373,713, filed on Aug. 13, 2010.

(51) Int. Cl.
*B65D 1/42* (2006.01)
*A47J 47/19* (2006.01)
*A47J 45/10* (2006.01)

(52) U.S. Cl.
CPC *A47J 47/19* (2013.01); *A47J 45/10* (2013.01); *Y10S 220/912* (2013.01)

(58) Field of Classification Search
CPC .................................. A47J 45/10; A47J 47/19
USPC .............. 220/378, 573.1, 642, 655, 694, 729, 220/62.12, 62.22, 639, 640, 641, 643, 755, 220/758, 769, 772, 912; 99/349, 353, 426, 99/428, 439, 442, 450.1; 427/239; 184/44
See application file for complete search history.

(56) References Cited

U.S. PATENT DOCUMENTS

| | | | |
|---|---|---|---|
| 6,382,449 B1 | 5/2002 | Kazmierski et al. | |
| D574,663 S | 8/2008 | Courington et al. | |
| 2002/0074334 A1 | 6/2002 | Karp | |
| 2006/0169693 A1 | 8/2006 | Yeung | |
| 2007/0080163 A1* | 4/2007 | Yeung | 220/675 |
| 2007/0284505 A1 | 12/2007 | Kaposi | |
| 2009/0065307 A1* | 3/2009 | Boyden et al. | 186/44 |
| 2010/0154683 A1* | 6/2010 | Royka | 108/28 |
| 2011/0186578 A1* | 8/2011 | Kawakami | 220/378 |

FOREIGN PATENT DOCUMENTS

| | | |
|---|---|---|
| JP | 63021276 U | 2/1998 |
| KR | 2020080000625 U | 4/2008 |
| WO | 2006100876 A1 | 9/2006 |

* cited by examiner

*Primary Examiner* — Fenn Mathew
*Assistant Examiner* — Elizabeth Volz
(74) *Attorney, Agent, or Firm* — Hamilton IP Law, PC; Jay R. Hamilton; Charles A. Damschen

(57) ABSTRACT

In one embodiment of a container protector the container protector comprises two opposing side skirts, two opposing end skirts, and a interior lip connected to both side skirts and end skirts. The container protector may also include one or more handle extension to facilitate use with a container having one or more handles. The container protector is designed to sealing fit around the top periphery of a container with the interior lip extending upward to prevent material within the container from flowing outward therefrom during transitions. Such transitions may be caused by heating, transportation, or other disturbances. The precise dimensions of the container protector will vary from one embodiment to the next, and the container protector may take any shape depending on the container for which it is designed.

8 Claims, 5 Drawing Sheets

CONTAINER PROTECTOR

CROSS REFERENCE TO RELATED APPLICATIONS

The present application claims priority from provisional U.S. Pat. App. Nos. 61/347,254 filed on May 21, 2010 and 61/373,713 filed on Aug. 13, 2010, both of which are incorporated by reference herein in their entireties.

FIELD OF INVENTION

The present invention relates to containers and lids therefore, and more specifically, to the prevention of spills during cooking or other transitions.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

DETAILED DESCRIPTION

Listing of Elements

Figure 1:
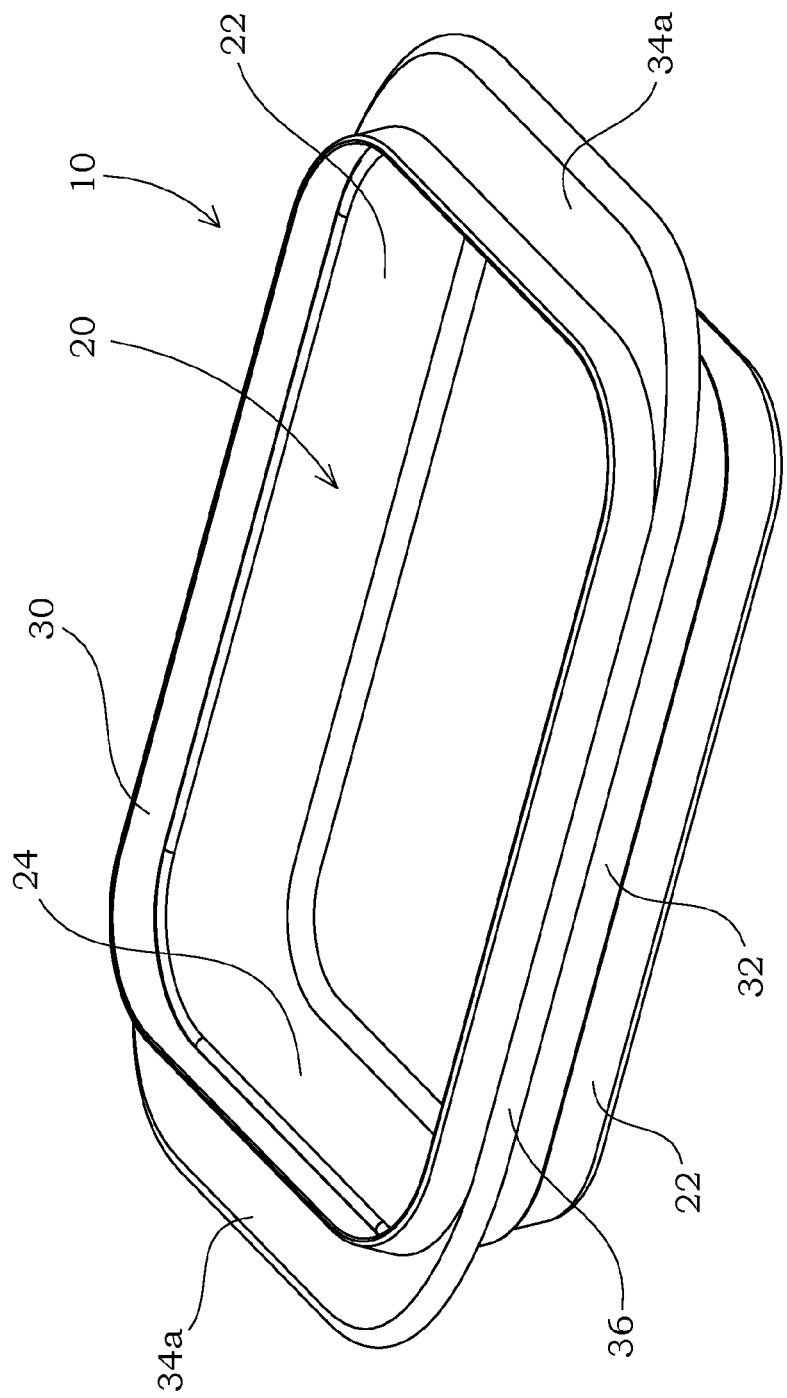
FIG. 1 provides a perspective view of a first embodiment of the container protector engaged with a container.

| ELEMENT DESCRIPTION | ELEMENT # |
| --- | --- |
| Container protector | 10 |
| Container | 20 |
| Container side wall | 22 |
| Container end wall | 24 |
| Container handle | 24a |
| Interior lip | 30 |
| Side skirt | 32 |
| End skirt | 34 |
| Handle extension | 34a |
| Ridge | 36 |
| Container protector with bottom | 40 |

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance. As used herein, the term "rectangle" is meant to include any quadrilateral having four right angles.

Referring now to the drawings, wherein like reference numerals designate identical or corresponding parts throughout the several views, FIG. 1 provide a perspective view of a first embodiment of the container protector 10 engaged with a container 20. The embodiment of the container protector 10 shown in FIG. 1 is configured to engage a container 20 that is rectangular in shape. Such containers 20 typically include two opposing container side walls 22 connected to two opposing container end walls 24 in one integral structure. Container handles 24a may be fashioned in the container end walls 24 to facilitate repositioning of the container 20 during use or otherwise moving the container 20.

The first embodiment of the container protector 10 includes two opposing side skirts 32 configured to seal against the container side walls 22. Two opposing end skirts 34 are configured to seal against the container end walls 34. The side skirts 32 are affixed to the end skirts 34 so that the shape of the container protector 10 is substantially the same as the shape of the container 20. Handle extensions 34a may be included in the end skirts 34 to seal against the container handle 24a in containers 20 that are configured with container handles 24a. However, container protectors 10 configured for use with containers 20 not having container handles 24a may be constructed without handle extensions 34a.

It is contemplated that the container protector 10 will be constructed of a pliable and/or semi-pliable material and configured so that the container protector 10 stretches by a certain amount when engaged with the container 20, thereby creating a hermetic seal between the container 20 and the container protector 10. That is, the elastic or semi-elastic nature of the container protector 10 allows it to expand so that it is secured to the container 20. Accordingly, in many applications the periphery of the container protector 10 will be less than the periphery of the container 20 for which it is designed. During use, attachment of the container protector 10 to the container 20 will require the user to stretch the container protector 10 over the container 20, thereby ensuring the container protector 10 is adequately secured to the container 20 and that an adequate seal is created between the container protector 10 and container 20.

An interior lip 30 may be connected to both the opposing side skirts 32 and the opposing end skirts 34. The interior lip 30 is configured to extend inward from the periphery of the container 20, which is best shown in FIGS. 1A and 1B, which provide different cross-sectional views of the container protector 10 engaged with a container 20.

Figure 1A:
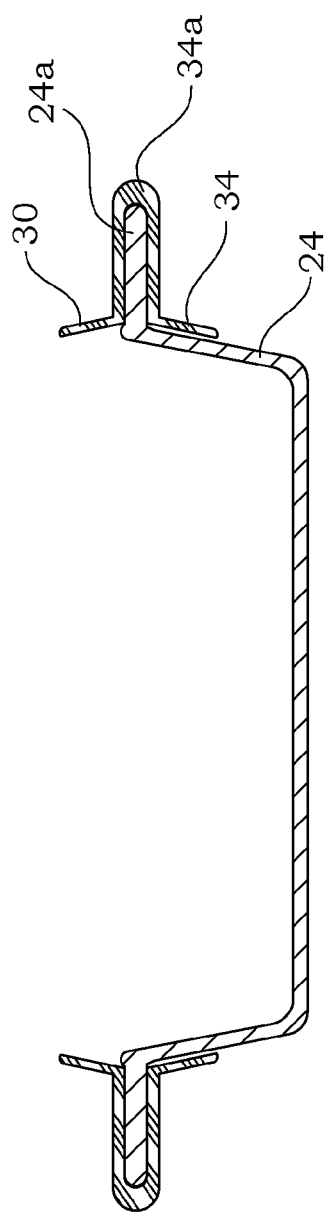
FIG. 1A provides a cross-sectional view of the first and second embodiment of the container protector engaged with a container adjacent a container end wall.
Figure 1B:
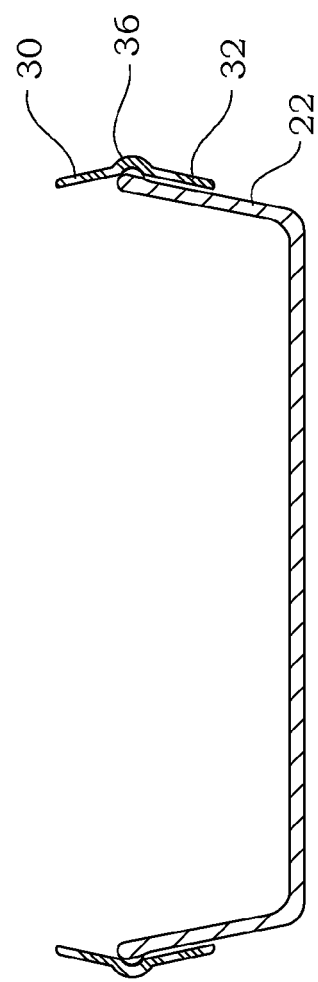
FIG. 1B provides a cross-sectional view of an embodiment of the container protector having a ridge formed therein.

A cross-sectional view of a portion of the container protector 10 and container 20 adjacent a container handle 24a and a handle extension 34a is shown in FIG. 1A. A cross-sectional view of a portion of the container protector 10 and container 20 along a container side wall 22 and side skirt 32 is shown in FIG. 1B. As shown in these various figures, the interior lip 30 extends upward beyond the periphery of the container 20 and inward therefrom. This extension of the interior lip 30 combined with the sealing engagement between the end skirts 34 and container end walls 24, the handle extensions 34a and container handles 24a, and the side skirts 32 and container side walls 22 serves to functionally increase the volume of the container 20. Accordingly, if material is positioned in the container 20 and the container 20 is subsequently heated, which may expand the material in the container 20, the container protector 10 may prevent the material from flowing out of the container 20. One example of such a situation is during cooking, especially baking scenarios. It is contemplated that the first embodiment of the container protector 10 will be sized to seal a nine-inch-by-thirteen-inch, seven-inch-by-eleven-inch, or other rectangular-shaped container 20. The container 20 may or may not include container handles 24a, and the container protector 10 may be formed accordingly (i.e., with or without handle extensions 34a).

Figure 2:
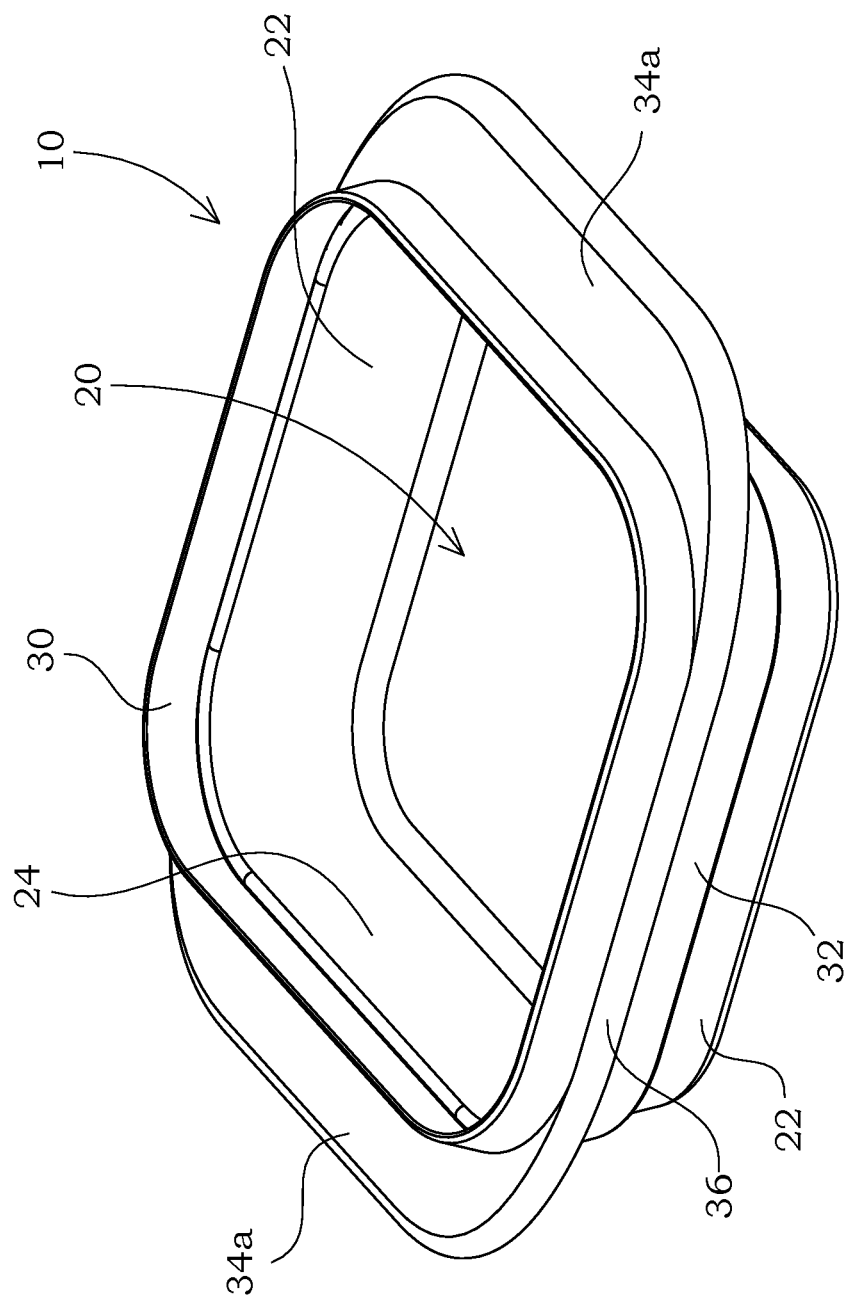
FIG. 2 provides a perspective view of a second embodiment of the container protector engaged with a container.

A second embodiment of the container protector 10 is shown in FIG. 2, wherein the container protector 10 is configured to seal against a square-shaped container 20. The container protector 10 in the second embodiment functions identically to that of the first embodiment. However, in the second embodiment of the container protector 10 the container protector 10 is sized to seal an eight-inch-by-eight-inch, nine-inch-by-nine-inch, or other square-shaped container 20. As with the first embodiment, in the second embodiment the container 20 may or may not include container handles 24a, and the container protector 10 may be formed accordingly (i.e., with or without handle extensions 34a).

Figure 3:
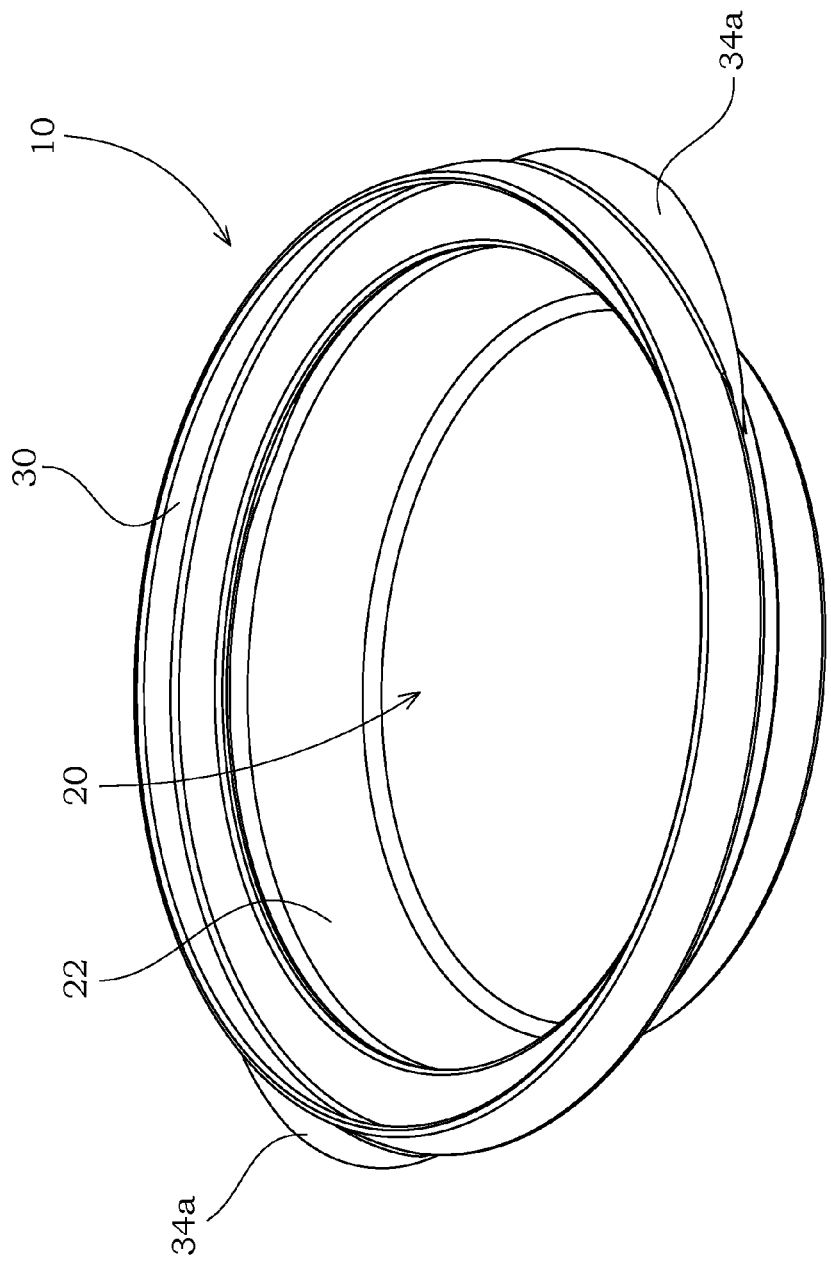
FIG. 3 provides a perspective view of a third embodiment of the container protector engaged with a container.

A third embodiment of the container protector 10 is shown in FIG. 3, wherein the container protector 10 is configured to seal against a circular-shaped container 20. The container protector 10 in the third embodiment functions identically to that of the first and second embodiments. However, in the third embodiment of the container protector 10 the container protector 10 is sized to seal circular-shaped container 20. As with the first and second embodiments, in the third embodiment the container 20 may or may not include container handles 24a, and the container protector 10 may be formed accordingly (i.e., with or without handle extensions 34a).

Figure 4:
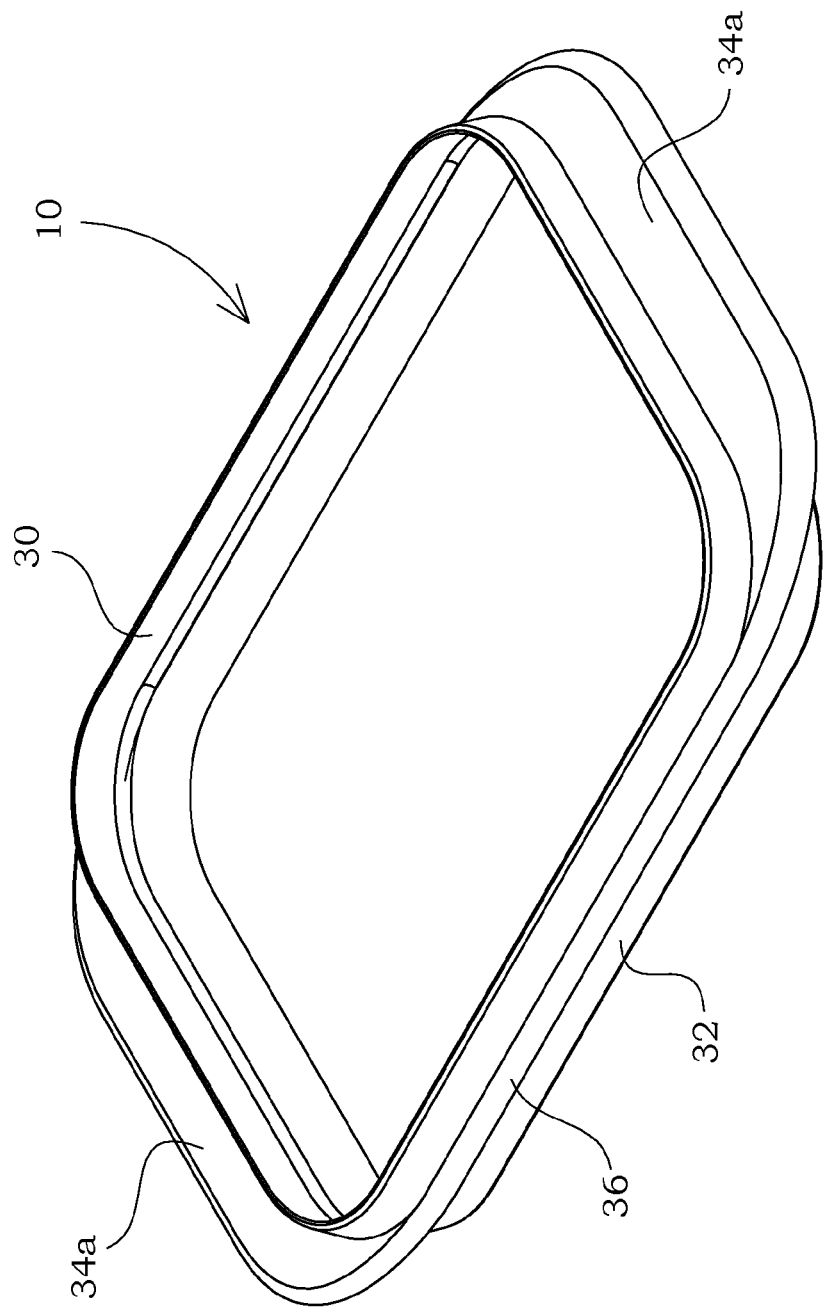
FIG. 4 provides a perspective view of another embodiment of the container protector.

A container protector with bottom 40 is shown in FIG. 4. The container protector with bottom 40 functions identically to the other embodiments of the container protector 10 disclosed herein. However, the container protector with bottom 40 includes a bottom portion 38 connecting the side skirts 32 and end skirts 34 so that the container protector with bottom 40 forms a type of vessel with substantially the same shape as the container 20 for which the container protector 10 is designed. The bottom portion 38 may be configured to either allow for or inhibit accumulation of baked-on materials between the container protector with bottom 40 and the container 20, thereby enhancing removal of food particles after use.

As is apparent in light of the present disclosure, when the container protector 10 is fully engaged with a container 20 for which the container protector 10 was designed, a seal is formed along the entire periphery of the container 20. This seal allows the interior lip 30 of the container protector 10 to act as an extension of the container 10, thereby effectively increasing the volume of the container 20. Accordingly, if the material positioned within the container 10 expands during cooking, baking, or during any other transitory condition put upon the material and/or container 20, the container protector 10 prevents the material from exiting the container 20.

The optimal dimensions of the height of the side skirt 32, and skirt 34, and interior lip 30 will depend on several factors, including but not limited to the specific application for the container protector 10 and the height of the container side and end walls 22, 24. However, it is contemplated that for most applications the height of the side skirt and end skirt 34 will be between 0.25 and 2.5 inches, and the height of the interior lip 30 will be between 0.1 and 2.5 inches. The thickness of the interior lip 30, side skirt 32, end skirt 34, and handle extension 34a will vary from one embodiment of the container protector 10 to the next, but for many applications a thickness between 0.1 and 0.7 inches will suffice. The length of the side skirts 32 and end skirts will vary depending on the size and configuration of the container 20 for which the container protector 10 is designed.

The various elements of the container protector 10 may be integrally formed as one unit, or the various elements may be separately formed and later affixed to one another. The container protector 10 may be formed of any material known to those of ordinary skill in the art that is suitable for the application for which the container protector 10 is used. Such materials include but are not limited to rubber, silicon, other polymers, or combinations thereof. It is contemplated that for some applications the container protector may be constructed of a silicone rubber material that is heat resistant up to 480 F, but the temperature that the material of construction will withstand in no way limits the scope of the container protector 10. The silicon rubber material is typically used in the construction of other types of bakeware due to its superior durability.

Other methods of using the container protector 10 and embodiments thereof will become apparent to those skilled in the art in light of the present disclosure. Accordingly, the methods and embodiments pictured and described herein are for illustrative purposes only.

It should be noted that the container protector 10 is not limited to the specific embodiments pictured and described herein, but is intended to apply to all similar apparatuses and methods for preventing a material positioned in a container from overflowing the container. Modifications and alterations from the described embodiments will occur to those skilled in the art without departure from the spirit and scope of the container protector 10.

The invention claimed is:
1. A container protector comprising:
  a. two opposing side skirts, wherein said side skirts are configured to extend downward along a first side and second side of a container to which said container protector is selectively engaged such that said opposing side skirts form a seal against said first and second sides of said container;
  b. two opposing end skirts, wherein said opposing end skirts are positioned between and affixed to said oppos- ing side skirts such that said opposing end skirts and said opposing side skirts substantially form a rectangle, and wherein said end skirts are configured to extend downward along a first end and a second end of said container such that said opposing end skirts form a seal against said first and second ends of said container;

c. two handle extensions, wherein each said handle extension is positioned in either said end skirt, and wherein said two handle extensions seal against respective container handles of said container to which said container protector is engaged;

d. an interior lip, wherein said interior lip is positioned around the interior periphery of said rectangle formed by said opposing end skirts and said opposing side skirts, and wherein said interior lip extends upward from a top of said first and second sides of said container and said first and second ends of said container and;

e. a ridge formed at a transition between said interior lip and said end skirts and between said interior lip and said side skirts, wherein said ridge is configured to simultaneously engage a distal end of said first and second sides and said first and second ends of said container so that a seal is formed between said container protector and said container along said first and second sides of said container.

2. The container protector according to claim 1 wherein said container protector is further defined as being configured to be securely engaged with the periphery of a rectangular-shaped container having a side wall length of thirteen inches and an end wall length of nine inches.

3. The container protector according to claim 1 wherein said container protector is further defined as being configured to be securely engaged with the periphery of a rectangular-shaped container having a side wall length of eleven inches and an end wall length of seven inches.

4. The container protector according to claim 1 wherein said container protector is further defined as having a side skirt that is between 0.25 and 2.5 inches in height.

5. The container protector according to claim 1 wherein said container protector is further defined as being configured to be securely engaged with the periphery of a square-shaped container having a side wall length of nine inches and an end wall length of nine inches.

6. The container protector according to claim 1 wherein said container protector is further defined as being configured to be securely engaged with the periphery of a square-shaped container having a side wall length of eight inches and an end wall length of eight inches.

7. The container protector according to claim 1 wherein said container protector is further defined as being constructed of a rubber silicone material.

8. The container protector according to claim 1 wherein said two opposing side skirts further comprise a ridge extending along the length thereof.

* * * * *